United States Patent [19]
Frost et al.

[11] Patent Number: 5,647,025
[45] Date of Patent: Jul. 8, 1997

[54] AUTOMATIC FOCUSING OF BIOMEDICAL SPECIMENS APPARATUS

[75] Inventors: Keith L. Frost, Seattle; Jon W. Hayenga, Kent; James A. Stephanick, Seattle; Robert C. Schmidt, Redmond, all of Wash.

[73] Assignee: NeoPath, Inc., Redmond, Wash.

[21] Appl. No.: 309,405

[22] Filed: Sep. 20, 1994

[51] Int. Cl.⁶ ............................................. G06T 5/20
[52] U.S. Cl. .................... 382/255; 250/201.3; 348/349
[58] Field of Search ................................ 382/255, 133, 382/308; 250/201.3, 201.7; 348/79, 345, 349, 350, 354, 356; 364/413.07, 413.08, 413.1, 555

[56] References Cited

U.S. PATENT DOCUMENTS

| | | | |
|---|---|---|---|
| 3,721,759 | 3/1973 | Lang | 348/345 |
| 4,000,417 | 12/1976 | Adkisson et al. | 250/201.4 |
| 4,012,634 | 3/1977 | Bouton et al. | 250/201.3 |
| 4,045,772 | 8/1977 | Bouton et al. | 382/134 |
| 4,342,905 | 8/1982 | Fujii | 250/201.3 |
| 4,600,832 | 7/1986 | Grund | 250/201.7 |
| 4,693,608 | 9/1987 | Kitagawa et al. | 348/128 |
| 4,810,869 | 3/1989 | Yabe et al. | 250/201.3 |
| 4,899,194 | 2/1990 | Hori | 382/255 |
| 5,003,165 | 3/1991 | Sarfati et al. | 250/201.7 |
| 5,040,228 | 8/1991 | Bose et al. | 382/255 |
| 5,151,609 | 9/1992 | Nakagawa et al. | 250/201.7 |
| 5,179,419 | 1/1993 | Palmquist et al. | 382/108 |
| 5,239,170 | 8/1993 | Hughlett | 250/201.3 |
| 5,257,182 | 10/1993 | Luck et al. | 382/133 |
| 5,287,272 | 2/1994 | Rutenberg et al. | 382/133 |
| 5,315,700 | 5/1994 | Johnston et al. | 395/502 |
| 5,430,288 | 7/1995 | Schielke et al. | 250/201.1 |

Primary Examiner—Joseph Mancuso
Assistant Examiner—Jon Chang
Attorney, Agent, or Firm—Moffa & Associates, P.A.

[57] ABSTRACT

A method for automatically focusing on a slide includes the steps of locating a coverslip, acquiring images from predetermined focal depths in the slide, and starting at an initial focal depth proximate the surface of the coverslip. A set of predetermined characteristics within each of the images are measured to generate at least one image measurement for each of the plurality of images. A focus measure is computed for each of the images, where each focus measure is a function of at least one image measurement. A best focus location is determined relative to a focal depth where an acquired image has a highest focus measure.

30 Claims, 12 Drawing Sheets

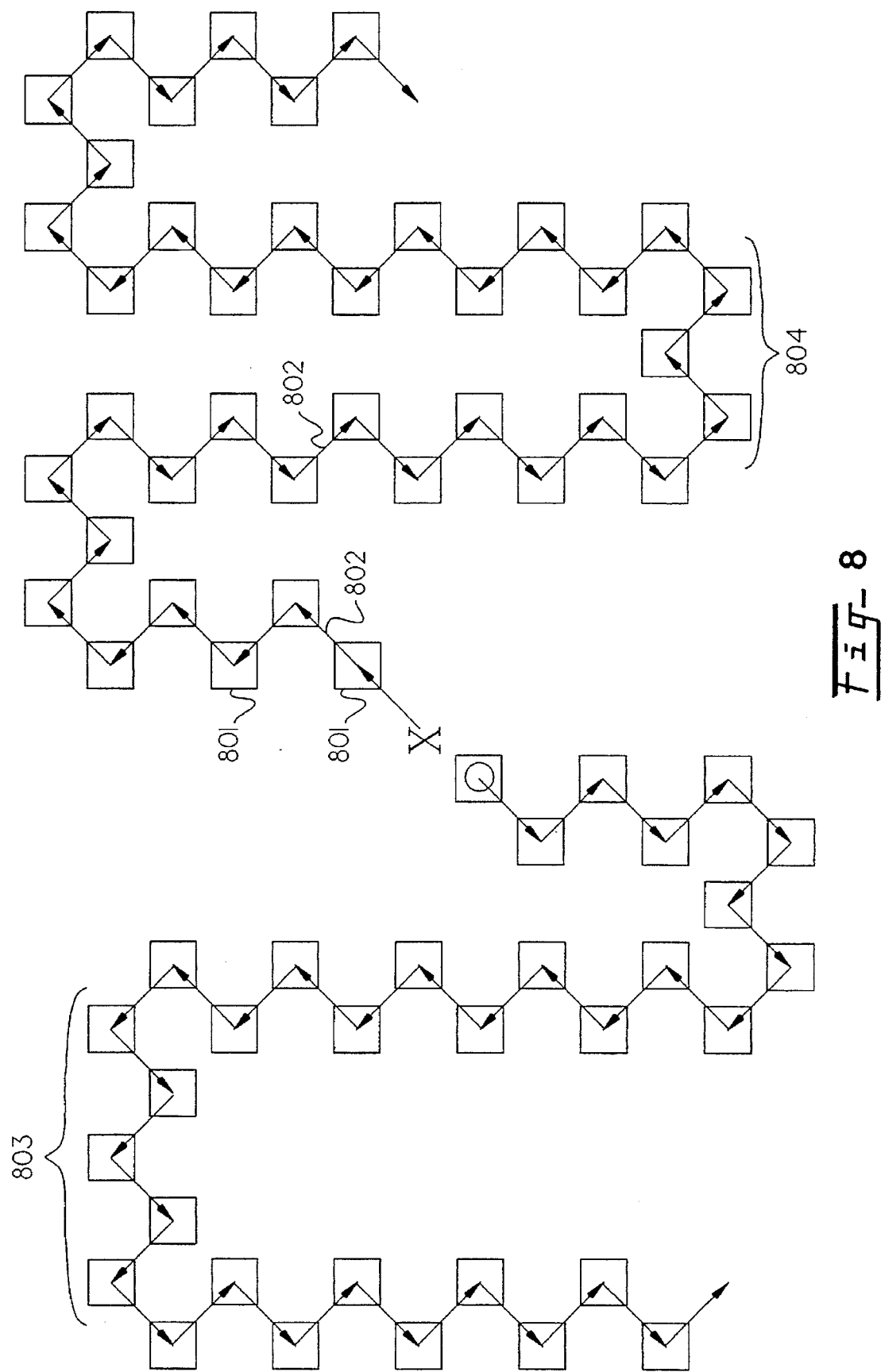

| | Fig. 9A | Fig. 9B | Fig. 9C | Fig. 9D |
|---|---|---|---|---|
| IMAGE | 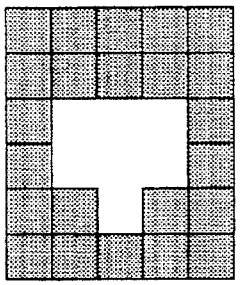 | 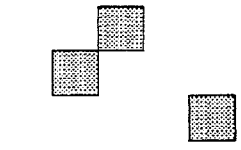 | 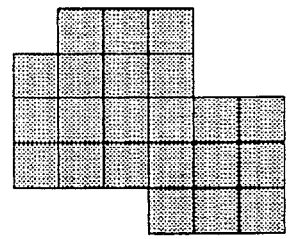 | 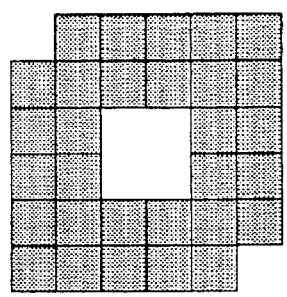 |
| ELEMENT | 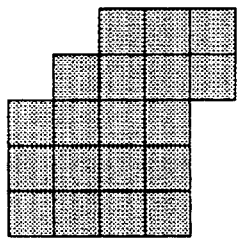 | | | |
| OPERATION | EROSION | DILATION | EROSION | DILATION |
| RESULT | 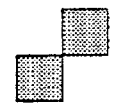 | |  | 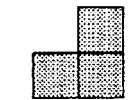 |

Fig-12A

PAN 1  PAN 2  PAN 3  PAN 4
1211   1212

AUTOMATIC FOCUSING OF BIOMEDICAL SPECIMENS APPARATUS

The invention relates to a method for automatically focusing on biological specimens, and more particularly to a microscope autofocus system which automatically focuses on features, patterns, or specific types of objects.

BACKGROUND OF THE INVENTION

Prior art autofocus systems, even those which form part of a system performing automatic pattern recognition on the objects focused, are not able to identify specific objects or types of objects while performing the focusing operation. This deficiency may permit them to focus on dust particles, scratches, or other artifacts, or to miss recognizing an object of interest because it was not in focus when automatic pattern recognition was performed. Prior art systems may focus on irrelevant details because they possess high frequency content and occur in the same region as an object of interest. The result is that a prior art system may miss an opportunity to focus on and identify an important feature, such as the nucleus of a cell.

Such problems are particularly acute when the field of view addressed by a single focusing operation is large, containing many objects of interest. There may be too many objects for time to allow independently focusing a system on each one. Yet a single focusing operation, encompassing the entire field, may not focus on the actual objects of interest, but instead on some irrelevant features, simply because they are large, or have a large high frequency content.

The need for accurate focusing of an automated optical system becomes critical when the system is designed to detect rare events, such as, for example, pre-cancerous cells occurring in a Pap smear. In the case of a Pap smear, a relatively enormous area must be scanned very quickly at low magnification. In one embodiment of an automated Pap smear scanning system, for instance, a 4× microscope objective, covering a field of view which is 1.4 mm square, is used for a low magnification scan. The area so scanned comprises the entire region under the coverslip of the smear, which may contain over 700 such fields of view.

The purpose of low magnification scanning is to identify possible pre-cancerous cells, comprising a tiny percentage of the smear, which need to be re-examined at high magnification. At low magnification, hundreds of objects may appear in a single field of view, so independently focusing on each one of them is not feasible. But if the system focuses on irrelevant matter rather than identifiable cell nuclei, the one pre-cancerous cell in a thousand may not be selected for examination at high magnification, resulting in a failure to detect a pre-cancerous condition.

Thus, it is critical for such a system to focus reliably and specifically on the objects of interest, and not on irrelevant features or artifacts in the specimen. Artifacts present in a Pap smear specimen may include flecks of graphite from the pencil used to mark the microscope slide, tiny splinters of wood from the instrument used to collect the specimen, blood, hair, strands of mucus, as well as thick clumps of cellular matter which may be unsuitable for examination by conventional transmission microscopy. A successful Pap smear scanning instrument must reliably focus on cell nuclei of interest, and not on this less relevant background of artifacts.

SUMMARY OF THE INVENTION

The invention provides a morphological image processing automatic focusing apparatus for focusing on biological specimens. The invention permits a computer to automatically identify objects of interest from a set of images collected from different focal depths, and automatically select the focal depth which corresponds to best focus on the objects of interest. Morphological criteria such as brightness, contrast, size, shape, texture, and context are used by the computer to identify objects of interest. Cells or cell nuclei of particular types are identified and automatically brought into focus as the specimen is scanned, while irrelevant artifacts are ignored.

In one aspect, the invention provides a method to bring into best focus only the objects of interest in a full field of view, while ignoring irrelevant matter, without the need to focus independently on each object of interest. In order to fully disclose the method, a preferred embodiment will be described herein in considerable detail, including the full context in which the method is employed, so that those skilled in the art will understand how to construct and apply the invention.

One example of a method for automatically focusing on a slide includes the steps of locating a coverslip, acquiring images from predetermined focal depths in the slide, and starting at an initial focal depth proximate the surface of the coverslip. A set of predetermined characteristics within each of the images are measured to generate at least one image measurement for each of the plurality of images. A focus measure is computed for each of the images, where each focus measure is a function of at least one image measurement. A best focus location is determined relative to a focal depth where an acquired image has a highest focus measure.

BRIEF DESCRIPTION OF THE DRAWINGS

The preferred embodiment of the invention is an autofocus system which guides the low magnification focusing of an automatic Pap smear screener. To illustrate the invention, the preferred embodiment will be described herein with reference to the accompanying drawings.

FIG. 8 shows paths of pattern recognition focus scans, referred to as cellular focus scans, over the surface of a specimen.

FIGS. 9A, 9B, 9C and 9D illustrate some typical morphological operations performed on a captured image.

FIGS. 12A, 12B, 12C and 12D illustrate some examples of results of cellular focus scans.

DETAILED DESCRIPTION OF THE PREFERRED EMBODIMENT

Figure 1:
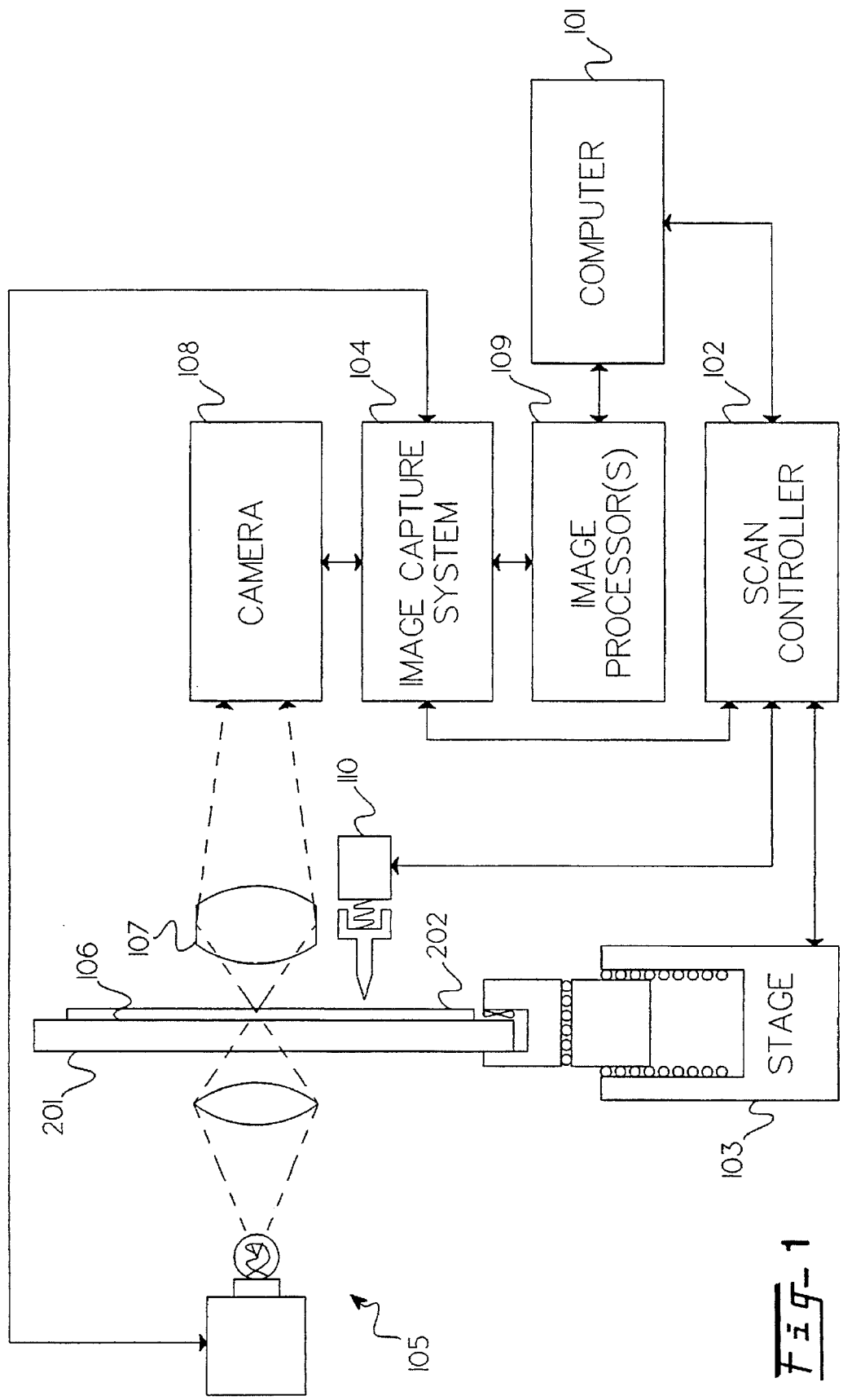
FIG. 1 shows a schematic block diagram of an apparatus of the preferred embodiment.

The preferred embodiment of the invention provides a method and apparatus for recognizing and focusing on cell nuclei in a biomedical specimen, using images captured from multiple focal planes by an automated microscope operating at low power magnification.

In a presently preferred embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 08/179,812 filed Jan. 10, 1994, now U.S. Pat. No. 5,528,703 which is a continuation in part of abandoned U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, filed 02/18/92, now U.S. Pat. No. 5,361,140 entitled "Method and Apparatus for Dynamic Correction of Microscopic Image Signals" by Jon W. Hayenga, et al.; and U.S. patent application Ser. No. 08/302,355, filed Sep. 7, 1994 entitled "Method and Apparatus for Rapid Capture of Focused Microscopic Images" to Hayenga, et al., which is a continuation-in-part of abandoned U.S. patent application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on even date herewith, and which are all hereby incorporated by reference including U.S. patent application Ser. No. 08/309,118, to Kuan et at. entitled, "Field Prioritization Apparatus and Method," U.S. patent application Ser. No. 08/309,061, to Wilhelm et al., entitled "Apparatus for Automated Identification of Cell Groupings on a Biological Specimen," U.S. patent application Ser. No. 08/309,116, to Meyer et al. entitled "Apparatus for Automated Identification of Thick Cell Groupings on a Biological Specimen," U.S. patent application Ser. No. 08/309,115, to Lee et al. entitled "Biological Analysis System Self Calibration Apparatus," U.S. patent application Ser. No. 08/308,992, to Lee et al. entitled "Apparatus for Identification and Integration of Multiple Cell Patterns," U.S. patent application Ser. No. 08/309,063, to Lee et at. entitled "Method for Cytological System Dynamic Normalization," U.S. patent application Ser. No. 08/309,248, to Rosenlof et al. entitled "Method and Apparatus for Detecting a Microscope Slide Coverslip," U.S. patent application Ser. No. 08/309,077, to Rosenlof et al. entitled "Apparatus for Detecting Bubbles in Coverslip Adhesive," U.S. patent application Ser. No. 08/309,931, to Lee et al. entitled "Cytological Slide Scoring Apparatus," U.S. patent application Ser. No. 08/309,148, to Lee et al. entitled "Method and Apparatus for Image Plane Modulation Pattern Recognition," U.S. patent application Ser. No. 08/309,250, to Lee et al. entitled "Apparatus for the Identification of Free-Lying Cells," U.S. patent application Ser. No. 08/309,209, to Oh et al. entitled "A Method and Apparatus for Robust Biological Specimen Classification," and U.S. patent application Ser. No. 08/309,117, to Wilhelm et al., entitled "Method and Apparatus for Detection of Unsuitable Conditions for Automated Cytology Scoring."

It is to be understood that the various processes described herein may be implemented in software suitable for running on a digital processor. The software may be embedded, for example, in image processors which may advantageously comprise digital processors, microprocessors or computers.

The Apparatus and the Specimen

Referring to FIG. 1, a schematic block diagram of one example of the apparatus of the invention is shown. The apparatus shown comprises a central computer 101, a real time scan controller system 102, which coordinates the motion of the motorized stage 103 of the microscope with the image capture system 104, a stroboscopic illumination system 105, a low-power microscope objective 107, an electronic camera 108 of the CCD type, one or more dedicated image processing systems 109, and a touch sensor 110. The stroboscopic illumination system 105 focuses a brief flash of light on the specimen 106. The specimen 106 is mounted on a glass slide 201 and protected under a transparent coverslip 202.

The computer 101 may be advantageously programmed to guide the steps of the focusing procedure as described in detail below. In FIG. 1, the arrows between the various components generally represent the flow of information between the parts of the apparatus.

Figure 2:
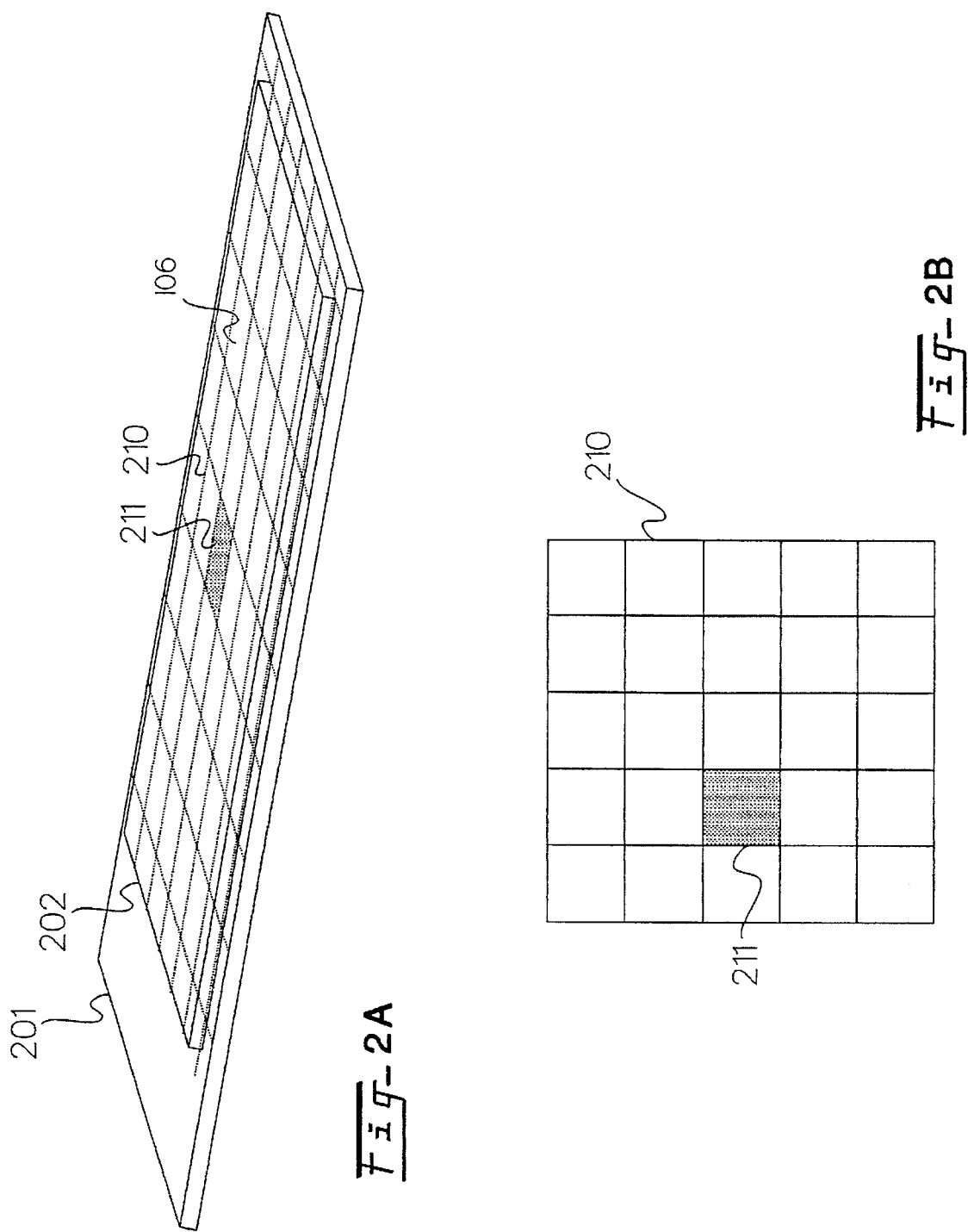
FIG. 2A shows a schematic of a coverslip and slide containing a specimen to be analyzed.
FIG. 2B is a diagram of a single low magnification field of view.

FIG. 2A schematically shows a more detailed view of a slide 201 on which a typical specimen 106 is mounted, then covered with a transparent coverslip 202. A typical slide 201 may be eighty millimeters long by twenty seven millimeters wide by one millimeter thick. A typical coverslip 202 may be sixty millimeters long by twenty four millimeters wide by 0.13 millimeters thick. The best focus on the specimen 106 varies from point to point, due both to warpage in the slide-coverslip combination, and to the intrinsically three-dimensional nature of the specimen itself.

A grid is shown superimposed over the slide 201 in FIG. 2A. The grid may not be visible in the physical embodiment of the invention, but is used herein for illustrative purposes. Grid is not shown to scale. The grid illustrates the division of the slide into low magnification fields of view such as 210, shown in more detail in FIG. 2B. Each of the low magnification fields of view 210 is divided into twenty five high magnification fields of view 211, for example. In one embodiment of the invention, a captured, digitized image of a low magnification field of view contains 512×512 pixels, and represents a specimen area of about 1.4 mm×1.4 mm.

Figure 3:
FIG. 3 is a sample image of a low magnification field of view of a Pap smear specimen, as captured by an example of the apparatus of the invention.

FIG. 3 shows an image of a low magnification field of view of a Pap smear specimen captured by an example of the apparatus of the invention, as illustrated in FIG. 1. Note the three-dimensional clumping 301 of the specimen in the image. The scanning system may need to focus on the individual cells, 302 for example, rather than on a clump such as 301. The preferred embodiment of the invention being described permits a system to focus on the individual cells in each field of view.

Finding the Coverslip

Figure 4:
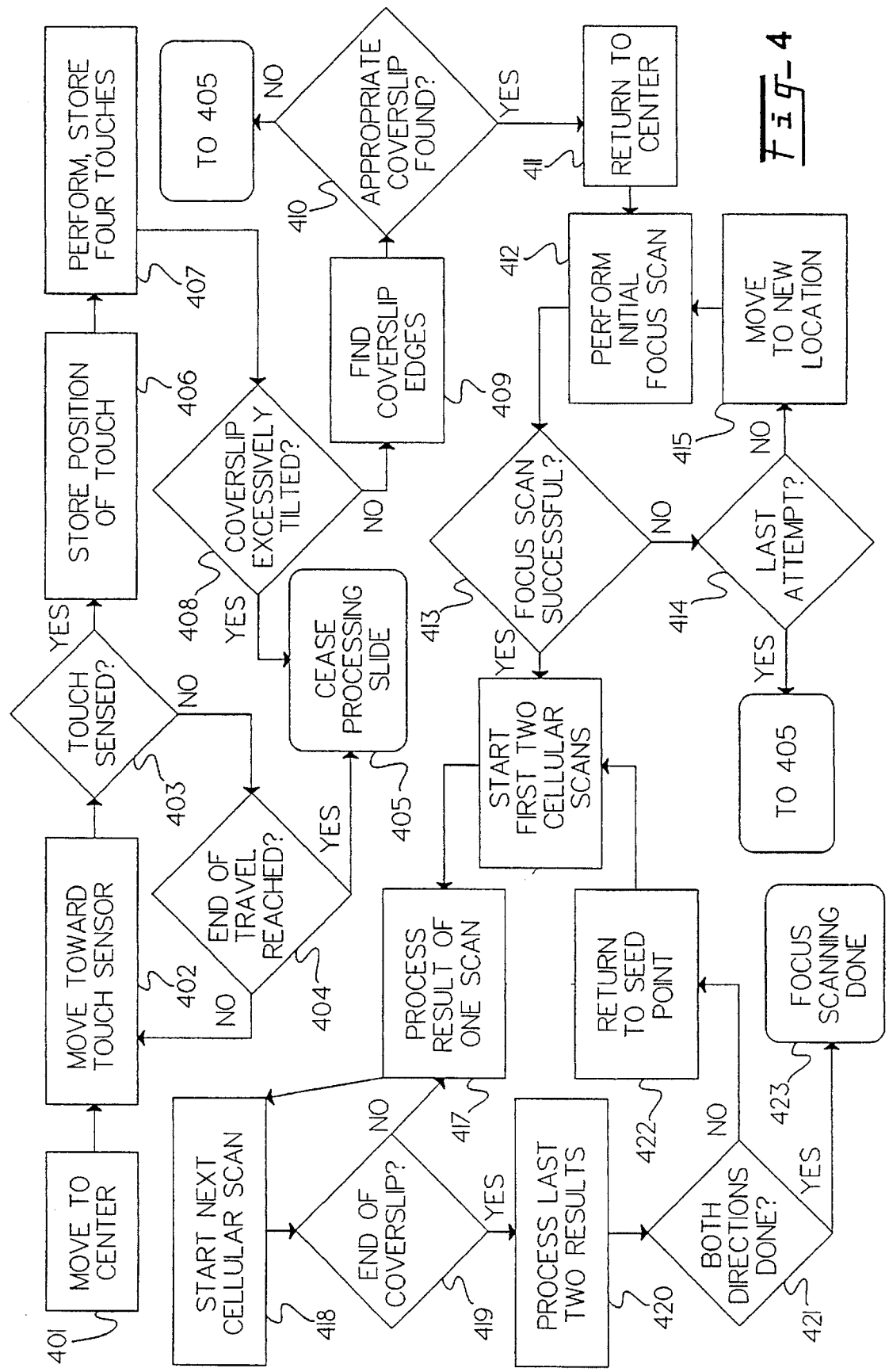
FIG. 4 is a high level flow diagram of a process by which the best focus positions on a specimen are determined.

Referring back to FIG. 1 while now also referring to FIG. 4, focusing on a specimen begins with the central computer 101 issuing instructions to the scan controller 102 to move the stage 103 to a predefined central location at process step 401. The central location is chosen with respect to the approximately known physical location of the specimen 106 in such a way that even a small coverslip, if properly placed over the specimen, must cover a substantial region around the central location.

At step 402, the central computer 101 instructs the scan controller 102 to move the stage 103 in the axis perpendicular to the slide 201, so that the specimen 106 approaches the touch sensor 110. This motion continues until either the touch sensor 110 records contact with the coverslip 202 over the specimen 106 at step 403, or the end of travel is reached, step 404. Reaching the end of travel at step 404 indicates that either no slide, or a slide which is too thin for the apparatus, is present, in which case the automatic processing of the slide in question halts at step 405.

When the touch sensor 110 indicates contact with the coverslip over the specimen 106 at step 403, the scan controller 102 reports the stage location at which the touch occurred to the central computer 101, which stores it at step 406. This location indicates the stage location of the top of the coverslip at the central point, and is used as a starting point for focusing. In particular, the location of the touch sensor 110 is calibrated to be a known distance from the focal plane of the objective lens 107 by using targets designed for this purpose. At step 411, this calibration will be used to move the stage 103 to a position such that the focal plane of the objective 107 lies just below the top of the coverslip 202 at the central touch location.

Before focusing can continue, however, the location of the coverslip must be better determined. Toward this end, at step 407, four more touches, substantially similar to the first one described above at steps 402 through 404, are performed at separate locations on the slide within a minimum central coverslip area. The location of the coverslip at each of these touches is also recorded. At step 408, a least squares plane is constructed from the five touch locations, and the tilt of the plane is compared with an allowed maximum. If the tilt exceeds the maximum, or if any of the four touches failed to record a location, processing of the slide is halted at step 405. An excessively tilted coverslip at step 408 usually indicates that the slide is improperly loaded in the apparatus.

At this point, since the approximate position of the coverslip is known, a more detailed search for its edges is undertaken at step 409. The methods of the search are beyond the scope of this invention. One such method is taught in U.S. patent application Ser. No. 08/309,248, entitled "Method and Apparatus for Detecting a Microscope Slide Coverslip," to Rosenlof, et al., assigned to the same assignee as the present invention, and filed on or before the filing date of the present patent application, and the details of Rosenlof, et al. are incorporated herein by reference. Other methods for identifying edges and boundaries of an object are also well known. The point to note is that before proceeding to focus on the specimen, the positions of the edges of the coverslip are determined, so that all scanning of the specimen can be kept within the bounds of the coverslip. At step 410, if the coverslip edges were not found, or if they indicated an inappropriate size or shape, processing of the slide is once again halted at step 405.

At step 411, the stage is returned to the center touch location, at such a height that the objective 107 focal plane is just beneath the touched surface of the coverslip 202. At step 412, focusing of the specimen 106 proceeds, with the central computer 101 instructing the scan controller 102 to coordinate the stage 103 motion with the image capture system 104 in order to perform an initial focus scan, starting from the position where the objective 107 focuses an image from just beneath the surface of the coverslip 202 at the central touch location onto the CCD camera 108.

The Initial Focus Scan

At this point we describe the initial focus scan in detail, referring in turn to FIGS. 5, 6A, 6B, and 7, while also referring to FIG. 1.

Figure 5:
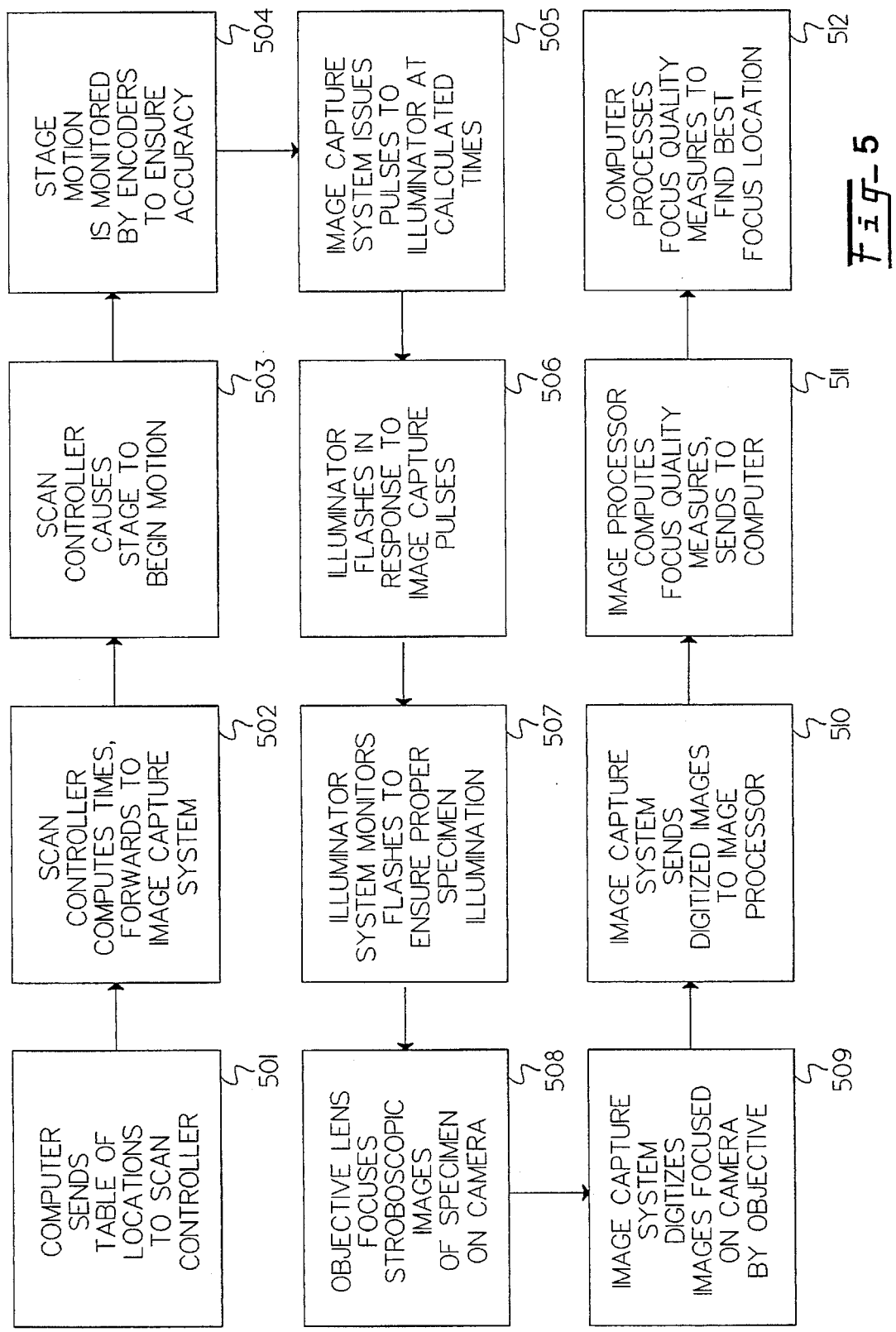
FIG. 5 is a flow diagram of a process by which images from different focal depths are gathered and processed in an example of the preferred embodiment.

The purpose of a focus scan is to acquire and process images from different focal planes in a specimen, in order to find the best focal plane. Any focus scan, in this example of the preferred embodiment, is performed as follows. Referring jointly to FIGS. 5 and 1, the central computer 101 passes to the scan controller 102 a list of stage locations at which images are to be collected, at step 501. The stage locations are chosen to cause the objective 107 to focus at different planes in the specimen 106.

The scan controller 102 computes the timing of the motion of the stage, and constructs a table, giving successive positions of the stage when images are to be collected, and the time when the stage will be at each location. The table entries are computed and passed to the image capture system 104 at step 502.

Once the image capture system 104 has received the table, at step 503, the scan controller 102 initiates the motion of the stage 103. The motion of the stage is monitored by encoders at step 504 to ensure accuracy. Any incorrect stage locations will be reported to the computer 101, which may reset the stage and restart processing.

At each time listed in the table, the image capture system 104 signals the stroboscopic illuminator 105 to flash at step 505. The illuminator 105 focuses a brief flash of light on the specimen 106 at the specified location at step 506. The illuminator system monitors the flashes of the strobe with a light sensor at step 507. Any missing flashes, or flashes of incorrect intensity, will be reported to the computer 101, which may halt processing of the slide.

At step 508, the objective 107 focuses an image from the illuminated field of view of the specimen 106 onto the camera 108. At step 509, the image capture system 104 collects a digital representation of the image thus acquired from the camera 108. In one example, the digital representation of the image consists of 512 rows by 512 columns of pixels, each of which is assigned a gray level from zero, representing the darkest level, to 255, representing the brightest. If necessary, the image may be sent in analog form from the camera 108 to the image capture system 104, then passed through an analog to digital converter to create the digital representation.

The image capture system 104 sends each digital image it acquires to the image processor(s) 109 at step 510. The dedicated image processor(s) 109 perform a preprogrammed sequence of morphological, computational, and logical operations on each image sent from the image capture system 104 to derive one or more measures of focus quality. These measures are computed and sent to the computer 101 at step 511. Once the computer 101 receives the measures from every image in the list originally sent to the scan controller 102 at step 501, it processes the list of measures in order to determine the optimum focus location at step 512.

All the while images are being captured and processed, the stage 103 continues to move the specimen 106 in accordance with the instructions from the scan controller 102, from step 503 onward, until the list of images to be collected is exhausted.

The initial focus scan starts, as noted above, from a position where the objective 107 is focused on an image plane just beneath the surface of the coverslip at the central touch location. It proceeds further beneath the coverslip, collecting one image for each depth of focus of the objective 107, until it is past the depth corresponding to the maximum coverslip optical thickness. The maximum coverslip optical thickness may be a predetermined allowable thickness depending upon the particular apparatus employed.

The initial focus scan is used to identify a starting point, called the seed point, for focusing the system on the specimen. Since it is not important whether or not this starting point is derived from cells in the specimen, or just dust or other matter on the surface of the slide, morphological pattern recognition is not used for the initial focus scan.

Figure 6:
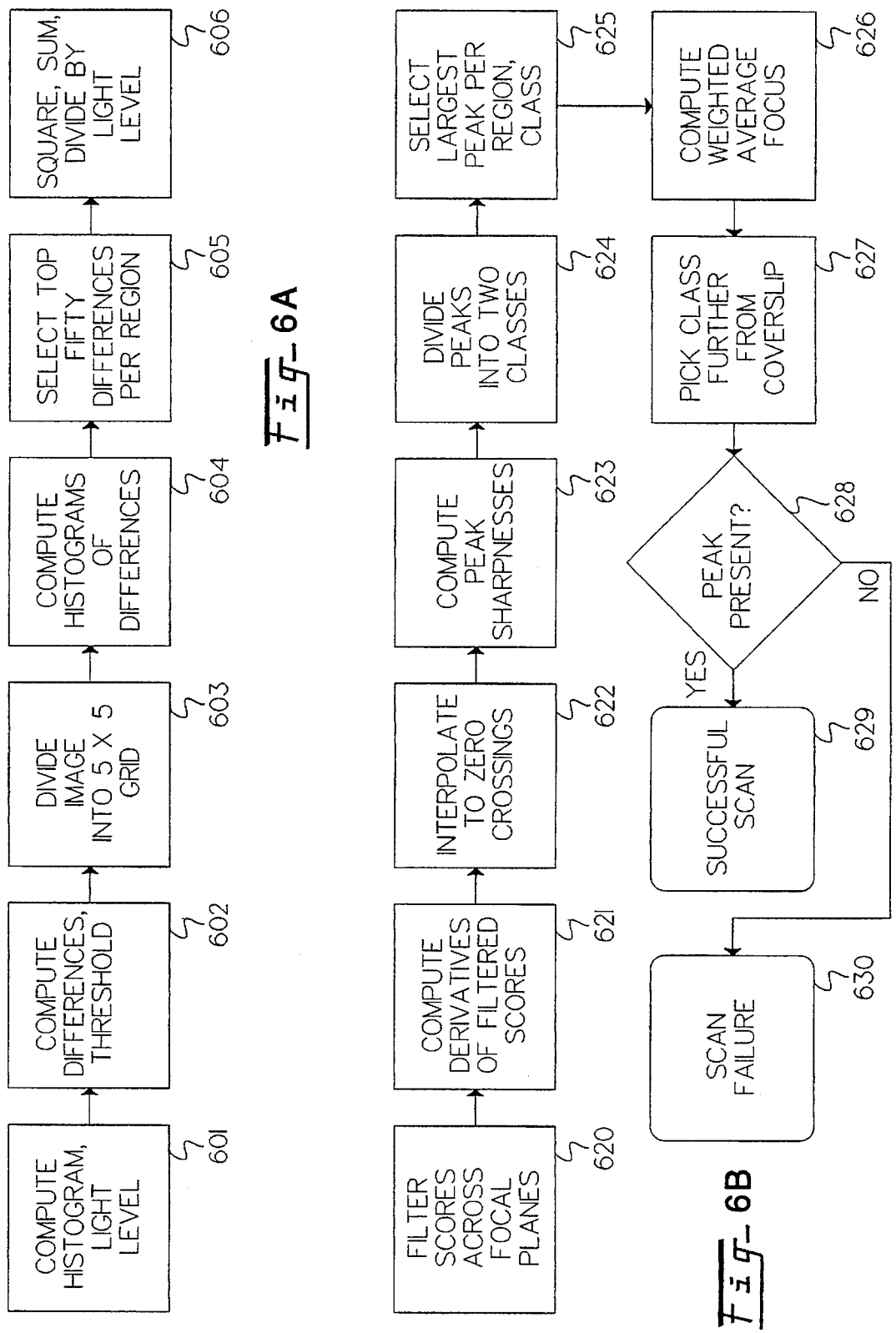
FIGS. 6A and 6B comprise a flow diagram of the processing of an initial focus scan, which uses a method referred to as a gradient focus score, and determines a starting point for the application of the pattern recognition focusing method.

Instead, a simpler intensity gradient focus quality measure is computed as follows. Refer to FIG. 6A, which shows the process flow diagram for the image processor when computing the gradient focus score. To begin with, at step 601, a histogram is computed of the gray levels of the image. This histogram is used to calculate a measure of the illumination brightness, or light level, present in the image. In particular, the light level may be defined as the highest intensity level at which 0.1% or more of the pixels of the image record a still higher intensity.

At step 602, the horizontal and vertical gradients in light intensity are computed at each of the pixels in the digitized image. For the vertical gradient, the computation is performed at each pixel by subtracting the intensity value of the pixel immediately below from that of the pixel immediately above. The horizontal gradient is computed in an analogous way. These gradients are compared to a threshold in order to reduce the effect of image noise on the measure of image sharpness. Gradients below the predetermined threshold value are treated as zero. Those skilled in the art, having the benefit of this disclosure, will understand that the threshold value may be derived empirically, or from the noise characteristics of the specific imaging apparatus used.

In order to be able to distinguish the best focus locations of different regions within the field of view, the image processor divides the field of view into a five by five grid, like the one shown in FIG. 2B, at step 603. Subsequent processing computes twenty five separate focus measures, one for each of the twenty five regions in the grid.

At step 604, fifty histograms are computed, two for each of the twenty five grid regions in the image. The two histograms are computed on the horizontal and vertical gradient images, respectively.

Even a focusing procedure which does not perform pattern recognition must take some account of the size of the objects to be focused, in order to acquire information from the appropriate range of spatial frequency. Because the focusing system described here is designed to work at low magnification on small objects, the intensity gradient algorithm takes size into account by using only the fifty highest gradients in each of the twenty five regions at step 605. The rest of the gradient histogram is ignored.

At step 606, the squares of these fifty gradients are summed, and divided by the light level, in order to produce twenty five focus scores for each image in the focus scan. The light level is used to normalize the scores in order to reduce their dependence on illumination from quadratic to linear. This is useful because the algorithm may be used on images in a context where the illumination may be, for some reason, obscured.

Once the image processing system 109 has computed the twenty five gradient focus scores for each image in the initial focus scan, it passes these scores, along with the matching focus positions, back to the central computer 101, as described above and shown as step 511 in FIG. 5.

The task of the central computer 101 in step 512 of FIG. 5 is to look for peaks in the focus score as a function of focus position in each of the twenty five regions, ignore spurious fluctuations due to noise, and make an initial approximation of the best focal plane. It accomplishes this as shown in FIG. 6B.

First, at step 620, the scores for each region are filtered across focus position in order to reduce noise in the focus scores. For this purpose, a Gaussian kernel with a half width at half maximum equal to the depth of field of the objective is used.

Second, at step 621, the derivative of the focus score with respect to position is computed for each region and position by subtracting the filtered focus score at each position and region from the succeeding position's filtered focus score for the same region.

Third, at step 622, peaks in the focus score in all regions are identified by looking for patterns across position of two positive derivatives followed by two negative derivatives, and checking to make sure that the focus score at the peak is above a pre-defined minimum, to avoid finding spurious peaks. The precise location of the peak is found by linear interpolation of the gradient to the zero crossing.

Figure 7:
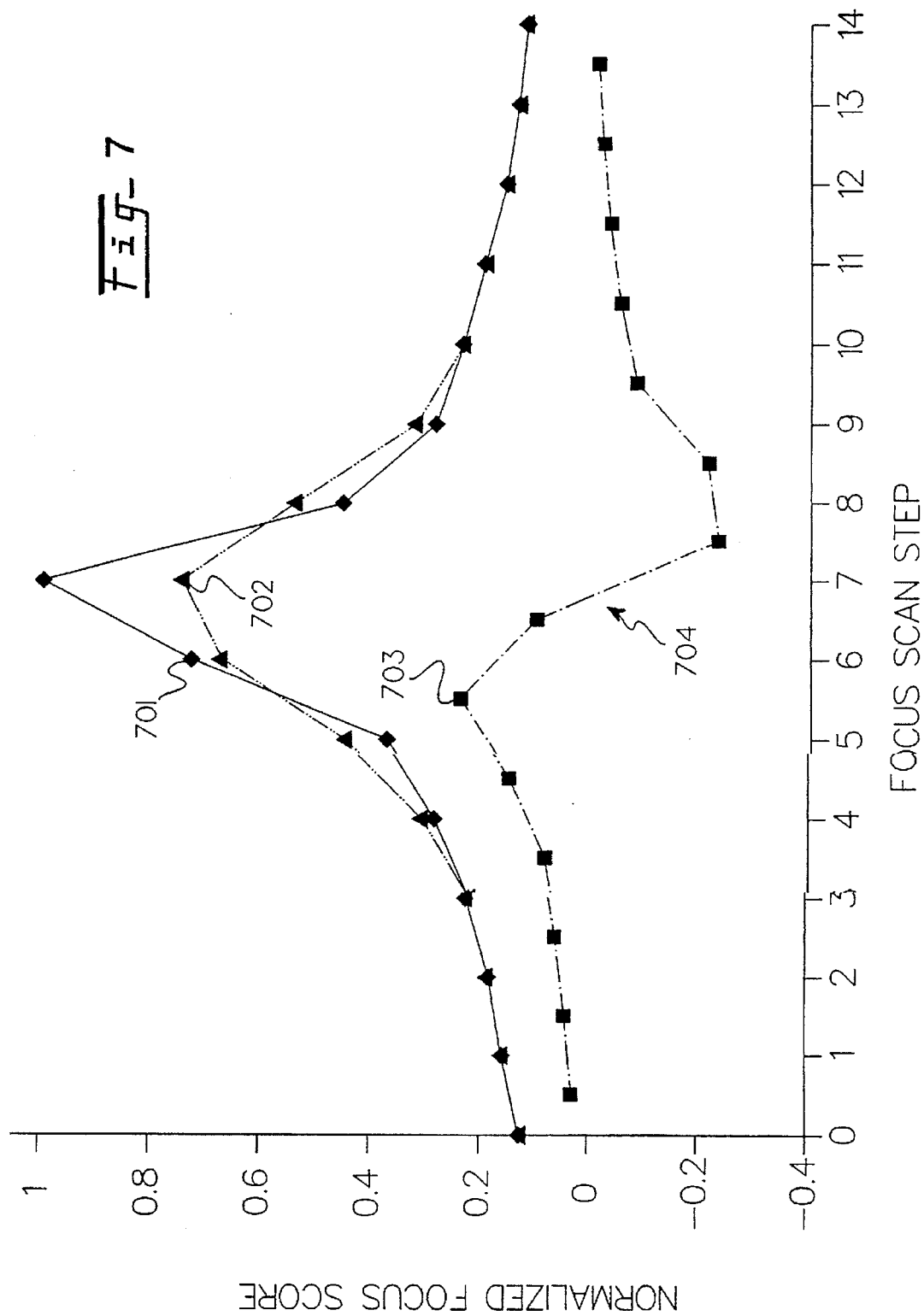
FIG. 7 is an example plot of a gradient focus score across a set of focal depths, a filtered version of the same, and the computed derivative of the filtered version, where the plots are used to illustrate a method by which peaks are found in the gradient focus score.

FIG. 7 illustrates the process of finding the peaks by plotting an example of the original focus scores 701, the Gaussian-filtered focus scores 702, and the differences of the filtered scores 703, versus focus position. The scores plotted in FIG. 7 represent the values found from a single region. The interpolated zero of the derivative at 704 represents the calculated position of the peak. Note the positive derivatives before the peak, and the negative derivatives after the peak.

Fourth, in step 623, the sharpness of each peak is measured by dividing the magnitude of the second derivative of the filtered focus scores at the peak by the magnitude of the peak. The sharpness provides an indication of how definite a preference for the given focus position the peak indicates.

Fifth, in step 624, all of the peaks found in all regions are divided into two classes: those which are one minimum coverslip optical thickness or more below the highest peak found, and those which are not. They are divided in order to separate any peaks which may be coming from dust on top of the coverslip from peaks coming from the specimen proper.

Sixth, at step 625, in each region, the peak with the highest focus score in each class is kept, while any other peaks in the same region and class are ignored. As a result, there are at most twenty five peaks in each class to consider.

Seventh, at step 626, a weighted average of the position of the peaks in each class is taken to represent the best focus position for the full field of view in each class. The peak positions are weighted by the relative peak sharpness calculated in step 623 to derive the weighted average. If any peak has a sharpness which is more than a factor of four less than the sharpest peak in the class, it is dropped from the averaging as being too soft a peak at this step. This leaves at most two possible focus positions. Note that it is possible that all the peaks are in the upper class, in which case there is only one focus position at this stage.

Eighth, to avoid the possibility of focusing on the top of the coverslip, if there are two focus positions, the class which is lower (further beneath the coverslip) is chosen as representing best focus on the specimen at step 627.

Ninth and finally, at step 628, if there were no valid peaks found at step 622, the scan fails to find a best focus position at step 630. Otherwise, the focus position chosen at step 627 is stored by the computer 101 at step 629. This completes the discussion of the initial focus scan.

Multiple Tries of Initial Scan

Referring back to FIG. 4, the result of the initial focus scan at step 412 is thus either a starting focus position, or a failure to find a peak. In nearly all cases, when a specimen-bearing slide which meets the physical requirements for coverslip thickness and placement is used, the initial focus scan described above is successful. This is because it requires very little material to focus on, and the scan is undertaken in the center of the slide, where there is likely to be some specimen.

However, if a failure is found at step 413, additional attempts are made to find a seed point for focusing. In particular, if fewer than a set number of attempts have been made at step 414, a new location is selected at step 415 on a field of view adjacent to the one at which a focus scan was just attempted, and processing returns to attempt another initial scan at step 412. The succeeding attempts may occur in a spiral pattern around the original touch point, so as to continue selecting new fields of view while remaining as close as possible to the central touch location. Only if all of the set number of attempts have been unsuccessful at step 414 does processing of the slide cease at step 405.

Pattern of Cellular Focus Scans

Once an initial focus position is found at step 412, the pattern recognition, or cellular, focus scans begin from this point, referred to as the seed point. FIG. 8 illustrates the path of the cellular focus scans across the surface of the specimen, where the location of the seed point is marked with an "X". The squares 801 indicate the fields of view scanned, while the arrows 802 show the path the stage follows. The purpose of following the path indicated is to come as close as possible to achieving a representative sample from the slide, while minimizing the time taken to scan. The stage used takes no more time to move simultaneously in two dimensions than to move in just one, so the diagonal moves illustrated maximize the speed of motion.

Referring also back to FIG. 4, at step 416, the first scans occur to the right of, and adjacent to, the seed point in FIG. 8. The zig-zag pattern illustrated in FIG. 8 turns around, as for example at 804, each time scanning approaches one of the edges of the coverslip. The entire pattern must come to an end before the far right end of the coverslip in FIG. 8. Scanning then resumes at steps 422 and 416, again starting adjacent to the seed point, to the left of the seed point, at the scan marked with a circle in FIG. 8. Note that the last reversal of scanning 803 drawn in FIG. 8 takes five steps, rather than the three steps taken by 804 and every other reversal. This illustrates the fact that, under conditions to be described below, the number of steps in a reversal is increased from three to five in order to speed processing of the specimen.

The first two cellular focus scans are centered about the focal plane defined by the seed point. Cellular focus scans are much more shallow than the gradient scans described above, consisting of the acquisition and processing of only four images, again separated by roughly the depth of focus of the objective lens. This makes the cellular scans much faster. Finding the best focus position from a cellular scan is necessarily a simpler operation than from a gradient scan, because there are only four points to work with. More burden is placed on the processing of the image to weed out signal from noise, and in particular, to recognize and focus principally on the nuclei of well-separated cells. Note that cells in clumps often provide less useful information, if their nuclei cannot be clearly distinguished.

Cellular Morphology

The processing of an image in a cellular focus scan is comprised of a combination of simple morphological operations. FIGS. 9A–9D illustrate four simple binary morphological operations. FIG. 9A illustrates an erosion with a three by three block, while FIG. 9B demonstrates a dilation with the same block. FIG. 9C shows an erosion with a five by five wire frame, and FIG. 9D illustrates a dilation with the same wire frame.

A morphological operation, such as an erosion or dilation, involves two entities. The first entity is the image which is operated on, and the second entity is a structuring element with which the operation is performed. The structuring element may be pictured as a grid of pixels, whose values are either "on" or "off", and which possesses a unique center pixel. The center pixels of the structuring elements in FIGS. 9A–9D are marked with X's.

A morphological operation may be envisions as placing the center of the structuring element, in turn, over each pixel in the original image. A binary operation operates on images whose pixels are either "on" or "off". The two simplest operations are binary erosion and dilation. Binary erosion turns "off" all pixels in the image which, when the structuring element is centered on them, have at least one "off" pixel of the image aligned with an "on" pixel of the element. All other pixels in the image are set to "on". Dilation turns "on" in the image all pixels which, when the structuring element is centered on them, have at least one "on" pixel of the image aligned with an "on" structuring element pixel. All other pixels are set to "off".

Binary erosion and dilation are readily generalized to grayscale erosion and dilation. Grayscale erosion replaces each pixel's value in the image by the minimum of the values of those pixels which correspond to "on" pixels in the element. Grayscale dilation replaces each pixel's value with the maximum of the values of those pixels which correspond to "on" pixels in the element. Erosion and dilation are combined to make compound operations. In particular, a dilation followed by an erosion with the same element is referred to as a closing, while an erosion followed by a dilation is an opening.

Figure 10:
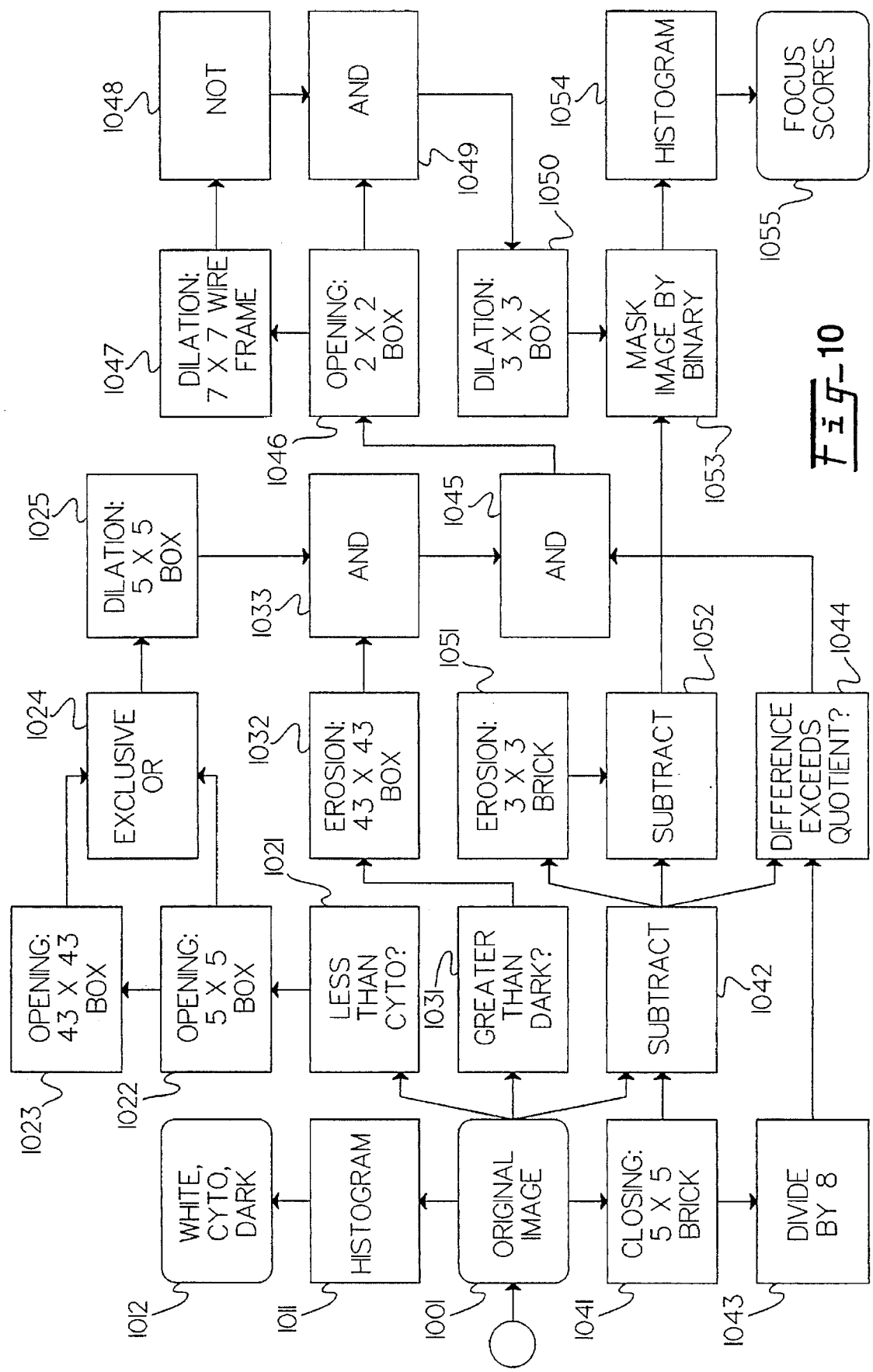
FIG. 10 shows a cellular focus score data flow diagram.

FIG. 10 is a data flow diagram of the cellular focus score morphological process. Each image from each cellular focus scan, after being stored in the camera 108 and digitized by the image capture system 104, is processed through this set of operations by the image processor(s) 109. As shown in FIG. 10, the process has four main branches.

On the first branch, a histogram 1011 is taken of the grayscale values of the image 1001, and three grayscale values 1012, called the white, cyto, and dark levels, are computed from the histogram. The white value is the same as the light level described in the discussion of the gradient focus score above. The cyto level is defined as 95% of the white value. As the name implies, regions of the image with gray levels below this level probably represent areas with at least some cytoplasm. The dark level is defined as $1/15$ of the white value, plus a quantity representing a noise floor.

Regions of the image with gray levels below the dark value represent either thick clumps of specimen, or artifacts of other material. Such regions are excluded from consideration in focusing.

On the second branch of the cellular morphology process, each pixel in the original image 1001 is tested at step 1021 to see if its gray level exceeds the cyto threshold. If it does, the corresponding pixel in a binary image is set to zero; if not, the binary pixel is set to one. The binary image thus produced passes through a morphological opening 1022 by a five by five box, followed by an opening 1023 by a 43 by 43 box.

The opening 1022 by the five by five box is designed to reject regions which are too small to actually represent cells, while the opening 1023 by the 43 by 43 box detects regions which are so large that they must represent groups of cells stuck together, rather than cells with gaps between them. In accord with the requirements of focusing on free-lying cells, the results of the two openings are exclusive-or'd together at step 1024 to generate a cytoplasmic binary image, which is then dilated 1025 by a five-by-five box, to pick up any nuclei which may be on the edges of their cells.

The third branch of the cellular focus score algorithm checks each pixel of the original image 1001 at step 1031 to find out if it has a gray level greater than the dark level defined above. If it does, the corresponding pixel of a binary image is set to one; if not, to zero. The resulting dark binary image is eroded 1032 by a 43 by 43 box to prevent focusing on the edges of thick clumps of specimen, or on regions laced with artifacts. The dark binary image is then and'd 1033 with the cytoplasmic binary image, to produce a binary image representing the allowed regions for nuclei to be recognized.

The fourth and final branch of the algorithm is designed to detect nuclei. It begins with a grayscale closing 1041 of the original image 1001 by a five by five brick. This closing will usually efface the nuclei of interest from the image. The original image 1001 is then subtracted at step 1042 from the result of the closing to produce a texture-enhanced inverted image, in which the nuclei appear as prominent bright spots.

In order to develop a binary image which identifies the nuclei, the result of the closing is divided by eight at step 1043, then tested against the texture-enhanced image at step 1044. If the gray level of the texture-enhanced image exceeds that of this measure of the local light level, the pixel in question is flagged as potentially part of a nucleus at step 1044. This binary image is and'd 1045 with the allowed regions binary image, to generate a binary mask of possible nuclear pixels.

The binary mask image thus produced at step 1045 has the defect that few restrictions on nuclear size or shape have been placed on it. The next steps are designed to rectify this limitation. First, an opening 1046 by a two by two box is applied to eliminate solitary pixels or single-width strands of pixels. Second, a dilation 1047 of the resulting mask by a seven by seven hollow frame of pixels is inverted 1048, then and'd 1049 with the mask to get rid of those parts of prospective nuclei which will not fit inside the seven by seven frame. This requires that the prospective nuclei be roughly elliptical in shape. Third and finally, the resulting binary image is dilated 1050 with a three-by-three box, in order to include the edges of the nuclei in the mask. The result of step 1050 is the final mask image, which identifies nuclei meeting all the requirements for focusing.

Even after the nuclei have been identified, it remains necessary to measure the sharpness with which they are focused. In order to do this, the texture-enhanced image produced at step 1042 is eroded 1051 by a three-by-three brick, and the resulting image subtracted 1052 from the texture-enhanced image itself, to produce an enhanced gradient image. At step 1053, this enhanced gradient image is then set to zero wherever the final mask image from step 1050 contains a zero, and left unaltered where the final mask image contains a one.

Finally, a histogram 1054 is taken of the gray levels of the resulting image, in order to add up a measure of the quantity of nuclear matter found, and of course, the sharpness of the focus on the nuclei. Two measures are computed from the histogram 1054 at step 1055 as follows. First, any level of the enhanced gradient image below 5% of the white level is ignored as due to non-nuclear material. Then, any pixel above this level is counted toward the sum of the total number of acceptable nuclear pixels, and the nuclear sharpness measure is computed as the mean square enhanced gradient level of those pixels which are above 5% of the white level. The sum of acceptable nuclear pixels is a measure of the amount of useful specimen found, while the nuclear sharpness measure is divided by the white level to reduce the dependence on light level, then used as the cellular focus score.

Cellular Focus Processing

Figure 11:
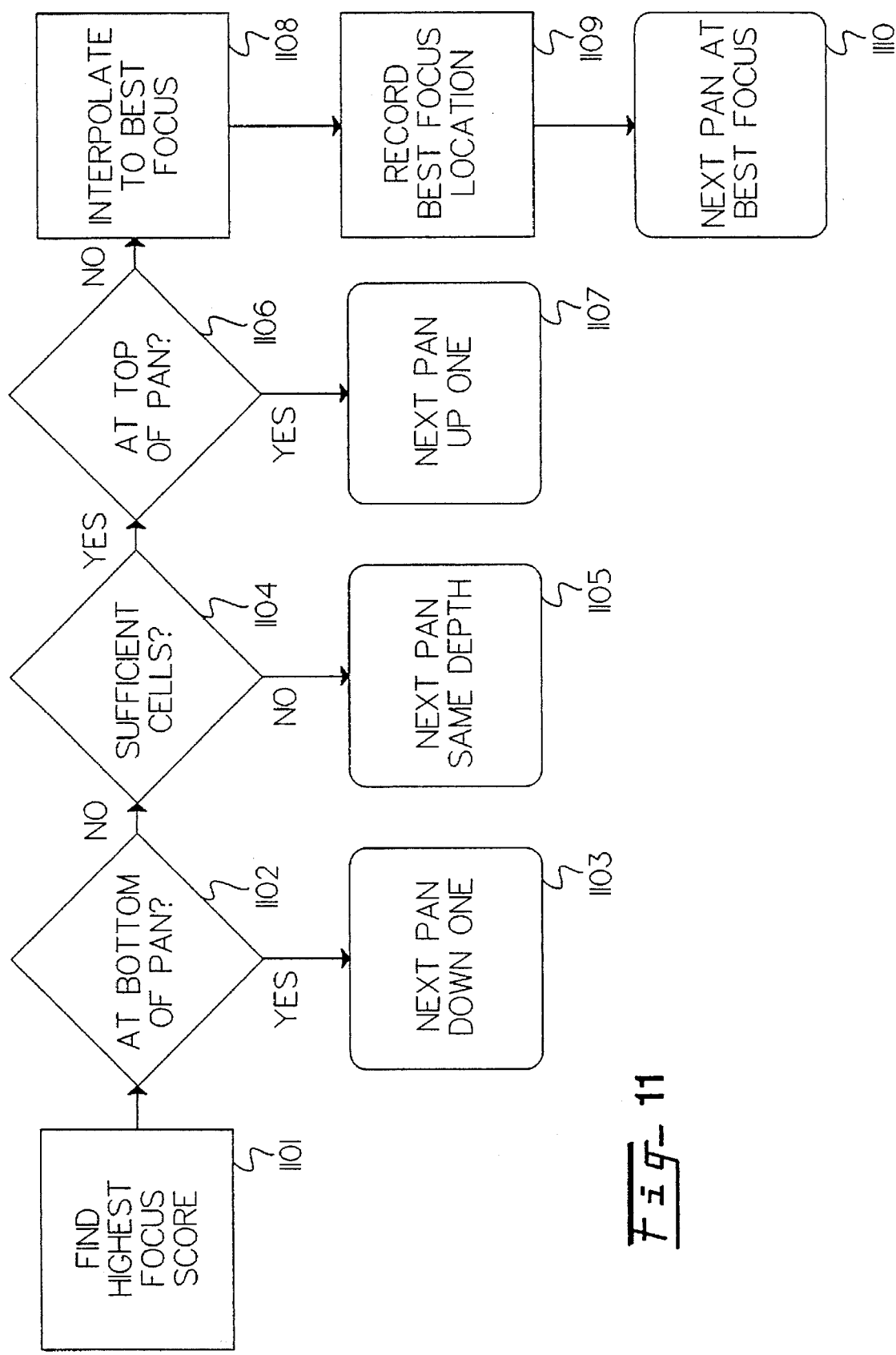
FIG. 11 is a flow diagram demonstrating processing of results of cellular focus scans.

The central computer 101 thus receives four focus scores and four pixel counts from the image processor(s) 109 for each cellular focus scan performed. Referring back to FIG. 5, this data transfer occurs as step 511. At step 512, the computer processes these measures. The processing occurs as illustrated in FIG. 11.

First, at step 1101, the computer determines which focus score is the highest. If the highest focus score is the one furthest from the coverslip at step 1102, the result of the focus scan is an indication that it is necessary to move further from the coverslip to seek a better focus plane at step 1103. If not, the nuclear pixel count of the image with the highest focus score is checked at step 1104 to see if it exceeds 0.1% of the image. If not, there is apparently not enough to focus on in this field of view, and the computer determines to continue scanning in the same plane at step 1105.

If the nuclear pixel count is greater than 0.1% of the image at step 1104, and the image with the highest focus score is the one closest to the coverslip at step 1106, the result of the focus scan is an indication that it might be necessary to move closer to the coverslip to seek a better focus plane at step 1107. Sufficient data is required before moving toward the coverslip in order to prevent moving to attempted focus on material on the coverslip over very sparse slides.

If the image with the highest focus score is neither at the top 1106 nor at the bottom 1102 of the scan, and the image with the highest focus score has a nuclear pixel count exceeding 0.1% of the image 1104, then the differences in focus scores can be linearly interpolated to locate the peak at step 1108. The interpolation is made to the zero crossing in the derivative, analogous to the interpolated zero crossing shown as 704 in FIG. 7. This indicates a successful finding of best focus, and its location is recorded at step 1109. Finally, at step 1110, the indication for further focusing is to center about the best focus plane recorded in step 1109.

Refer again to FIG. 4 to follow the usage of cellular focus scans in the focus scanning of the specimen. As noted above, the first two cellular focus scans in step 416 are centered about the plane defined by the seed point. At step 417, the result of the first of these scans is processed by the computer 101. After deriving the result, the computer 101 requests the next cellular scan at step 418.

Refer back to FIG. 11 which shows the possible results of the focus scan just processed. If the result of the focus scan just processed indicated that focus should be lowered 1103, the requested scan 418 is centered one focus step lower than the scan just processed. If the result indicated that not enough data was available 1105, the requested scan 418 is centered about the same plane as the scan just processed. If the result indicated that focus should be brought higher 1107, the plane of the last successful focus scan is tested to see if the current focus position is less than half a minimum coverslip optical thickness above it. If so, the requested scan 418 is centered one focus step higher. If not, then, to prevent attempting focus on the top of the coverslip, the requested scan 418 is centered about the same plane as the scan just processed.

Referring again to FIG. 4, at step 419 the computer tests the position of the focus scan just requested to see if it is at the far right or left end of the coverslip, in accord with the scanning pattern shown in FIG. 8. If it is not, the computer returns to step 417 to compute the result of the scan just completed, then request a new scan again at step 418. Note that the focal height of each cellular scan is based on the result of the scan two before it. This allows the scan controller 102, image capture system 104, image processor(s) 109, and computer 101 to continuously process focus scans in parallel as fast as the stage can move, with no lag time spent waiting for the results of a computation.

When an end of the coverslip is reached at step 419, there are two focus scan results still to be processed at step 420. Then, at step 421, the computer checks to see if focus scanning has already proceeded in both directions from the seed point as shown in FIG. 8. If it has, the cellular focus scanning of the specimen is complete at step 423. If not, the machine returns to the seed point at step 422, then begins scanning in the opposite direction back at step 416. The first two focus scans in both directions are centered about the plane of the seed point.

FIGS. 12A–12D illustrate some examples of the way cellular focus scan depths are placed to track the results of the scan two before, in accord with the description given above of process steps 416-419 from FIG. 4. Each of FIGS. 12A–12D begins with two cellular focus scans centered about the same plane.

The result of the first scan of FIG. 12A, as symbolized by the shaded box 1211, is that the image closest to the coverslip received the highest focus score, and that it received a high enough nuclear pixel count to indicate that a move toward the coverslip was warranted. The result of the second scan, symbolized by the unshaded box 1212, is that once again, the image closest to the coverslip received the highest focus score, but that it did not contain enough data to warrant a move toward the coverslip. The third focus scan, in accordance with the result of the first one, is centered one focus step higher than the first one. The fourth scan, in accord with the result of the second one, is centered about the same plane as the second one.

FIG. 12B begins with two successful focus scans, with the interpolated position of best focus indicated by the shaded circles 1221, 1222. As discussed above, the third scan is centered about the interpolated best focus from the first one, and the fourth scan, about the best focus from the second scan.

FIG. 12C demonstrates that, whether a nuclear pixel count surpassing the threshold is present or not, if the highest focus score occurs furthest from the coverslip, the second focus scan following will be centered one focus step lower. The shaded box 1231 symbolizes that the image furthest from the coverslip received the highest score, with sufficient data, from the first pan. The unshaded box 1232 symbolizes that the image furthest from the coverslip received the highest focus score, but without sufficient nuclear pixels, from the second pan. Thus, the third and fourth scans are both shifted one focus step from the coverslip, even though the result of the second scan, as symbolized by the unshaded box 1232, did not contain enough data to surpass the threshold.

FIG. 12D begins with two unsuccessful scans, where the highest focus score occurred in one of the two central images of the scan, but, as symbolized by the unshaded boxes 1241, 1242, there was insufficient data present to surpass the threshold. As discussed above, the next two scans are therefore centered about the same plane as the first two.

A minimum number of successful cellular focus scans is needed to accurately focus on a specimen. In one example embodiment, the minimum number is 24 scans. If this number is not reached after all scans as shown in FIG. 8 are completed, the specimen must be rejected for automatic processing. Pap smears rejected for this reason are usually unsatisfactory because of insufficient squamous cellularity.

On the other hand, if the minimum number of successful scans is reached early in processing, and many successful scans continue to occur, it is desirable to accelerate processing of the slide in question, because it will be accurately focused even if fewer scans are performed. Thus, after the minimum number of successful cellular focus scans is reached, for each traverse of the slide on which more than some threshold number of successful scans occurred, the next reversal of motion of the slide takes five steps, rather than three. An example is shown of the five step reversal 803 between the last two traverses at the left side of FIG. 8. This speeds focus processing of the slide.

Uses of the Focus Scan Data

Once cellular focus scanning is completed, and the results of all the successful focus scans are accumulated, the successful focus points may be used to fit a model of the focus surface of the specimen. One example of such a model is given by the ten-parameter polynomial equation:

$$Z=C_0+C_1x+C_2y+C_3x^2+C_4xy+C_5y^2+C_6x^3+C_7x^2y+C_8xy^2+C_9y^3$$

where z is the height of best focus on the specimen, x and y are the coordinates of the specimen parallel to the slide, and $C\_0, \ldots, C\_9$ are ten parameters to be adjusted. These parameters may be adjusted to minimize, for example, the mean square error from the surface determined by Equation 1, and the successful focus points. The minimized mean square error, if corrected to remove the ten degrees of freedom taken up by the free parameters of Equation 1, may then be used as a measure of how accurately the specimen can be focused based on the model. A specimen with an unacceptably large mean square error may be rejected.

Once a model of the focus surface of the specimen is available, it may be used as a guide to scan the entire specimen under the coverslip at low power magnification. It may also be used as a starting point for the high power magnification focusing of the specimen.

The successful focus scan data may also be used, along with the height of the coverslip given by the touch sensor, to estimate the optical thickness of the coverslip over the specimen. If the coverslip optical thickness is too large or too small, it will produce an unacceptably large spherical aberration when the specimen is viewed through a high resolution objective lens, and the specimen may be unsuitable for high power microscopic examination.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for automatically focusing on a slide comprising the steps of:
    (a) locating a coverslip having a bottom surface;
    (b) acquiring a plurality of images from a plurality of predetermined focal depths relative to the slide, starting at an initial focal depth proximate the bottom surface of the coverslip;
    (c) measuring a set of predetermined characteristics within each of the plurality of images to generate at least one image measurement for each of the plurality of images;
    (d) computing a focus measure for each of the plurality of images, where each focus measure is a function of at least one image measurement, wherein the focus measure is derived from morphological operations, computational operations, and logical operations on the at least one image measurement; and
    (e) determining a best focus location relative to a focal depth where an acquired image has a highest focus measure.

2. The method of claim 1 wherein the step of computing a focus measure further comprises computing an intensity gradient focus measure, where the set of predetermined characteristics comprises gray levels of each of the plurality of images.

3. The method of claim 2 wherein the step of computing a focus measure further comprises the step of computing a filtered focus measure.

4. The method of claim 1 wherein the step of determining a best focus location further comprises the steps of:
    (a) computing a derivative of the focus measure between the plurality of images; and
    (b) interpolating a value of the derivative to its zero crossing.

5. The method of claim 1 wherein the step of computing a focus measure further comprises computing a focus score, where the set of predetermined characteristics comprise morphological features and the focus score varies according to measurements of the morphological features.

6. The method of claim 1 wherein the step of computing a focus measure further comprises the steps of:
    (a) computing an intensity gradient focus measure, where the set of predetermined characteristics comprise gray levels of the acquired image; and
    (b) computing a filtered focus measure, wherein the step of determining a best focus location comprises the steps of:
        (i) computing a derivative of the filtered focus measure between the plurality of images, and
        (ii) interpolating a value of the derivative to its zero crossing.

7. The method of claim 6 wherein the step of determining a best focus location further comprises the step of comparing the intensity gradient focus measure to a threshold so as to reduce an effect of image noise by reducing intensity gradient focus measures below the threshold.

8. The method of claim 1 wherein the step of computing a focus measure further comprises the step of computing a focus score, where the set of predetermined characteristics further comprise morphological features and the focus score varies according to measurements of the morphological features, and where the step of determining a best focus location comprises the steps of computing a derivative of the focus score between the plurality of images, and interpolating the value of the derivative to its zero crossing.

9. The method of claim 8 wherein the step of determining a best focus location further comprises comparing an image content measure corresponding to a highest focus score against an image content threshold so as to determine a relative significance of the focus measure.

10. The method of claim 1 wherein the step of determining a best focus location further comprises the steps of:
    (a) checking if the acquired image having the highest focus measure is farthest from the coverslip, if it is, then focussing at a focal depth further from the coverslip;
    (b) checking if the acquired image having the highest focus measure exceeds a predetermined measure of image content, and if it does not then continuing to acquire images at the same focal depth;
    (c) checking if the acquired image having the highest focus measure is closest to the coverslip, and if it is then continuing to acquire images at a focal depth closer to the coverslip; and
    (d) otherwise linearly interpolating differences in focus scores to locate a best focus.

11. The method of claim 1 wherein the step of locating a coverslip further comprises the steps of:
    (a) mounting a slide including coverslip in an optical path of an automated microscope including a stage and a touch sensor;
    (b) moving the stage to a predefined central location;
    (c) moving the stage so that the slide approaches a touch sensor and continuing until either a predefined end of travel is reached, or the touch sensor contacts the coverslip; and
    (d) using a position relative to a location of the stage where the touch sensor contacted the coverslip for focusing.

12. The method of claim 11 wherein the step of locating a coverslip further comprises the steps of:
    (a) making additional touches of the coverslip;
    (b) recording a location of the coverslip at each additional location; and
    (c) determining if the coverslip is excessively tilted.

13. The method of claim 1 further comprising the steps of:
    (a) computing an optical thickness of refractive medium; and
    (b) determining suitability of a preparation of the slide based upon the optical thickness.

14. The method of claim 1 wherein the slide is mounted on a stage, and wherein the step of acquiring images further comprises the steps of:
    (a) constructing a table of successive positions of a stage where images are to be collected;
    (b) moving the stage;

(c) sending a pulse of light through the slide; and (d) collecting a representation of the image.

15. The method of claim 14 further comprising the step of monitoring stage motion.

16. The method of claim 14 further comprising the steps of:

(a) monitoring a light source and signaling any failure to flash; and (b) if there is a failure to flash, then, tagging the image as invalid.

17. The method of claim 1 wherein the step of acquiring images further comprises the steps of focusing at a plurality of positions beneath the coverslip, collecting at least one image for each position, where images are only collected at positions within a maximum coverslip optical thickness.

18. The method of claim 11 further comprising the steps of acquiring images on an adjacent field of view of the slide, where the adjacent field of view lies in a plane which is substantially parallel to a top surface of the slide, and focussing a new field of view in a spiral pattern around a central point until an acceptable focus position is located.

19. The method of claim 2 wherein the step of computing an intensity gradient focus measure further comprises the steps of:

(a) computing a gray level histogram of one of the plurality of images;

(b) measuring a light level from the gray level histogram;

(c) for each image computing at least one gray level gradient; and (d) selecting at least one subset of the at least one gray level gradient and processing the squares of gradients of a selected at least one subset in relation to the light level to produce at least one intensity gradient focus measure.

20. The method of claim 4 wherein the step of determining the best focus location further comprises the steps of:

(a) locating peaks in the focus measure in relation to the zero crossing of the derivative;

(b) measuring sharpness of each peak;

(c) classifying each peak into a first class and a second class; and (d) combining all peaks within each of the first class and second class by calculating the weighted average of the locations of the peaks wherein the weighted average is related to the sharpness.

21. The method of claim 8 further comprising the steps of:

(a) locating a seed point;

(b) moving from the seed point to acquire focus data from an interleaved array of sample positions; and (c) using the focus data to estimate best focus at positions intermediate to the sample positions.

22. An automated apparatus for automatically focusing an image acquisition system on a slide comprising:

(a) means for processing including a computer means for generating a plurality of control signals;

(b) means, coupled to the plurality of control signals, for locating a coverslip;

(c) means, coupled to the plurality of control signals, for acquiring images, the means for acquiring images being located to view a plurality of predetermined focal depths, starting at an initial focal depth proximate the surface of the coverslip;

(d) wherein the processor means further comprises means, coupled to the means for acquiring, For measuring a set of predetermined characteristics within each of the plurality of images to generate an image measurement for each of the plurality of images;

(e) means, coupled to the measuring means, for computing a focus measure for each of the plurality of images, where each focus measure is a function of a selected image measurement, further, wherein each focus measure is derived from morphological operations, computational operations, and logical operations on the at least one image measurement; and (f) wherein the processing means further comprises means, coupled to the computing means, for determining a best focus location relative to a focal depth where an acquired image has a highest focus measure.

23. The automated apparatus of claim 22 wherein the means for computing a focus measure further comprises means for computing an intensity gradient focus measure, where the set of predetermined characteristics comprises gray levels of the image.

24. The automated apparatus of claim 22 wherein the means for computing a focus measure further comprises a means for computing a filtered focus measure.

25. The automated apparatus of claim 22 wherein the means for computing a focus measure further comprises a means for computing a derivative of the gradient focus measure.

26. The automated apparatus of claim 22 wherein the means for computing a focus measure further comprises means for computing a focus score, where the set of predetermined characteristics comprises morphological features, and the focus score varies according to measurements of the morphological features.

27. The automated apparatus of claim 22 wherein the means for computing operates all elements in parallel.

28. The method of claim 11 wherein the step of locating a coverslip further comprising the step of determining whether the slide is within a range of thickness.

29. The method of claim 1 where the step of determining a best focus location of a first field of view occurs simultaneously with the step of acquiring images from a subsequent field of view.

30. The method of claim 21 where the acquisition and processing of focus data occurs in parallel in order to reduce the time for determining the best focus location.

* * * * *

UNITED STATES PATENT AND TRADEMARK OFFICE
CERTIFICATE OF CORRECTION

PATENT NO. : 5,647,025
DATED : July 8, 1997
INVENTOR(S) : Keith L. Frost et al.

It is certified that error appears in the above-identified patent and that said Letters Patent is hereby corrected as shown below:

<u>In the Claims</u>

Column 18, line 9, delete the word "; For" and replace it with -- , for --.

Signed and Sealed this

Fourteenth Day of July, 1998

*Attest:*

BRUCE LEHMAN

*Attesting Officer*     *Commissioner of Patents and Trademarks*